(12) United States Patent
Stemmle et al.

(10) Patent No.: US 9,202,611 B2
(45) Date of Patent: Dec. 1, 2015

(54) ARRANGEMENT WITH THREE SUPERCONDUCTIVE PHASE CONDUCTORS

(71) Applicant: NEXANS, Paris (FR)

(72) Inventors: Mark Stemmle, Hannover (DE); Beate West, Hannover (DE)

(73) Assignee: NEXANS, Paris (FR)

( * ) Notice: Subject to any disclaimer, the term of this patent is extended or adjusted under 35 U.S.C. 154(b) by 62 days.

(21) Appl. No.: 13/946,459

(22) Filed: Jul. 19, 2013

(65) Prior Publication Data
US 2015/0031545 A1    Jan. 29, 2015

(30) Foreign Application Priority Data
Jul. 25, 2012  (EP) ..................................... 12305909

(51) Int. Cl.
| | |
|---|---|
| *H01F 6/06* | (2006.01) |
| *H01B 12/02* | (2006.01) |
| *H02G 15/105* | (2006.01) |
| *H01B 12/16* | (2006.01) |
| *H02G 15/34* | (2006.01) |

(52) U.S. Cl.
CPC ................ *H01B 12/02* (2013.01); *H01B 12/16* (2013.01); *H02G 15/1055* (2013.01); *H02G 15/34* (2013.01); *Y02E 40/648* (2013.01)

(58) Field of Classification Search
CPC ........ H01B 12/02; H01B 12/16; H02G 15/34; H02G 15/1055; Y02E 40/648

USPC ......................................................... 505/163
See application file for complete search history.

(56) References Cited

U.S. PATENT DOCUMENTS

| | | | |
|---|---|---|---|
| 7,238,887 B2 | 7/2007 | Hirose | |
| 2008/0007374 A1* | 1/2008 | Mirebeau et al. | ............. 335/216 |
| 2011/0275521 A1* | 11/2011 | Stemmle et al. | ............. 505/163 |

FOREIGN PATENT DOCUMENTS

DE          10210007077       *  5/2011      ............... H01B 9/02

OTHER PUBLICATIONS

Machine Translation of DE 10210007077, 2011.*

* cited by examiner

*Primary Examiner* — Paul Wartalowicz
(74) *Attorney, Agent, or Firm* — Sofer & Haroun, LLP

(57) ABSTRACT

An arrangement is provided with three superconductive phase conductors each with a conductor, a dielectric and an electrically conductive screen surrounding the dielectric. The three phase conductors are arranged in a cryostat which conducts a cooling agent and which is made from a pipe with a thermal insulation. The screens of each of the conductors are for forming three, or a whole number multiple of three, sections arranged successively in the longitudinal direction by partial screens in a first, a second and a third section at two locations or at two locations spaced apart from each other. The partial screen of a first section of each phase conductor is electrically conductively connected in series to the partial screens of the second section and further to the third section of the two other phase conductors.

4 Claims, 1 Drawing Sheet

ARRANGEMENT WITH THREE SUPERCONDUCTIVE PHASE CONDUCTORS

RELATED APPLICATION

This application claims the benefit of priority from European Patent Application No. 12 305 909.9, filed on Jul. 25, 2012, the entirety of which is incorporated by reference.

BACKGROUND

1. Field of the Invention

The invention relates to an arrangement with three superconductive phase conductors, which are arranged in at least one cryostat which conducts a cooling agent and which is composed of a pipe having a thermal insulation, and which is constructed of: a superconductive conductor as well as a dielectric and an electrically conductive screen surrounding the dielectric (U.S. Pat. No. 7,238,887 B2).

2. Description of Related Art

A superconductive cable or a corresponding phase conductor has an electric conductor of a material which changes over into the superconductive state at sufficiently low temperatures. The electrical direct current resistance of a correspondingly constructed conductor is zero with sufficient cooling as long as a certain current—the critical current—is not exceeded. Superconductive cables having cold and hot dielectric are known.

In a superconductive cable with cold dielectric, the superconductive conductor is surrounded by a dielectric composed of layers of insulation material. For example, bands composed of polypropylene which are laminated with paper can be used for the dielectric. Such a cable is composed, for example, of the superconductive conductor and a superconductive screen arranged concentrically relative to the conductor, wherein the conductor and the screen are separated from each other and spaced from each other by the dielectric. An appropriate cable is surrounded during operation by a cryostat which conducts a cooling agent, for example liquid nitrogen, and which is composed of two concentric metal pipes which are insulated from each other by a thermal insulation. The cooling agent penetrates the dielectric of the cable and, as a result, simultaneously is the impregnating agent for the cable.

In a superconductive cable with hot dielectric only the superconductive conductor is mounted directly in a cryostat through which a cooling agent flows. The dielectric and the screen composed in this case of an electrically normally conducting material, for example copper, are arranged outside of the cryostat.

U.S. Pat. No. 7,238,887 B2 discloses an arrangement with three superconductive phase conductors which are arranged together in a cryostat composed of two concentric pipes which are thermally insulated relative to each other. Each phase conductor is composed of a superconductive conductor, a dielectric surrounding the superconductive conductor, a superconductive screen or return conductor mounted above the dielectric. During operation of the arrangement, the three phase conductors are arranged in a cooling agent flowing through the cryostat. Accordingly, the construction of the arrangement corresponds to that of the described cable with cold dielectric.

OBJECTS AND SUMMARY

The invention is based on the object of providing a simpler construction of the arrangement described in the beginning on the one hand, and, on the other hand, of reducing the transmission losses to the phase conductors used in the arrangement.

In accordance with the invention, this object is met in that
- the screens of each of the three phase conductors are, for forming three, or a whole number multiple of three, sections extending successively in the longitudinal direction of the phase conductors, completely interrupted by partial screens, at two locations or at two locations arranged at a distance from each other, into a first, a second and a third section, and
- the partial screen of a first section of each phase conductor is electrically conductively connected in series with the partial screens of a second section and further, a third section of the two other phase conductors.

The through connection of the partial screens of the different sections of the three phase conductors according to the invention can also be called "cyclical intersection." This cyclical intersection of the partial screens has the advantage that, during operation of the arrangement with phase conductors which operate according to the principle "cold dielectric," that for the screen thereof a normally conductive material, for example copper, can be used which is significantly less expensive as compared to superconductive material. Because of the cyclical intersection of the partial screens, no currents are induced in the partial screens, so that the transmission losses of the phase conductors are reduced. This is also true if phase conductors are used in the arrangement which are constructed according to the principle "hot dielectric." Accordingly, this arrangement is capable of transmitting higher powers independently of the construction of the phase conductors.

BRIEF DESCRIPTION OF THE DRAWINGS

Embodiments of the subject matter of the invention are illustrated in the drawings.

In the drawing.

DETAILED DESCRIPTION

Figure 1:
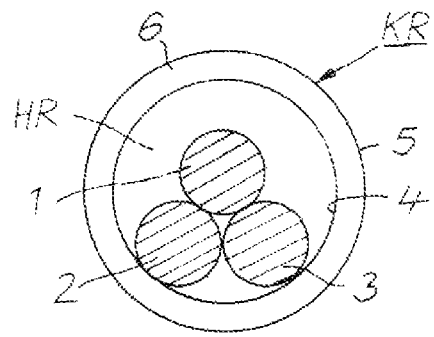
FIG. 1 shows the arrangement with three superconductive phase conductors in a schematic illustration.

FIG. 1 shows schematically an arrangement with three superconductive phase conductors 1, 2 and 3 which are together arranged in a cryostat KR. In accordance with the illustrated embodiment, the cryostat KR may be composed of two pipes 4 and 5 of metal, arranged concentrically and at a distance from each other, wherein a thermal insulation 6 is arranged, preferably a vacuum insulation, between the pipes 4 and 5. The pipes 4 and 5 are preferably of high grade steel. They may be undulated transversely of their longitudinal direction. The pipes 4 and 5 may also be of a sufficiently stable synthetic material which may be reinforced with glass fibers. They are then so-called "GFK pipes." The cryostat KR surrounds a hollow space HR in which the three phase conductors 1, 2 and 3 are arranged and through which a cooling agent, for example liquid nitrogen, is conducted. The cryostat KR should include at least one pipe which is surrounded by an effective thermal insulation.

Figure 2:
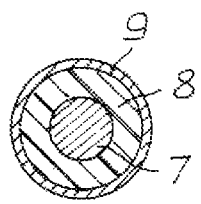
FIGS. 2 and 3 are sectional views of differently constructed phase conductors.

In accordance with FIG. 2, the phase conductors 1, 2 and 3 are composed of a superconductive conductor 7 whose construction in different embodiments is basically known, a dielectric 8 surrounding the conductor 7 and a screen 9 arranged above the dielectric 8. Accordingly, these are phase conductors with cold dielectric.

Figure 3:
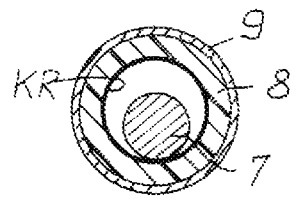

The three phase conductors 1, 2 and 3 may also be accommodated separately of each other in their own cryostat. This apples particularly to superconductive phase conductors with hot dielectric in accordance with FIG. 3, which are always arranged as single line cables in a separate cryostat. The superconductive conductor 7 is, in this case, arranged in a cryostat KR surrounded by the dielectric 8 indicated only by a somewhat thicker drawn circle, above which the screen 9 is located. The cryostat KR is preferably constructed in the same manner as the cryostat KR according to FIG. 2.

For preparing the phase conductors 1, 2 and 3 for the operation in an arrangement according to the invention, the screens thereof are completely severed at least at two predetermined locations. This is illustrated, for example, in FIG. 4 for one of the phase conductors. The number of locations where the screens of the phase conductors are severed depends upon their length. Severing of the screens should result in three sections, preferably of equal length, for each phase conductor or for a whole number multiple of "3" phase conductors.

Figure 4:
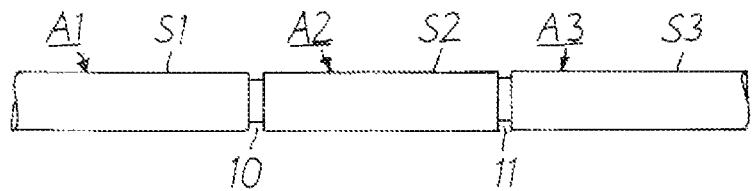
FIG. 4 is a side view of a phase conductor prepared for use in the arrangement according to the invention, in a schematic illustration.

The screen of the phase conductor illustrated in FIG. 4 is divided by severing at the locations 10 and 11 into three sections A1, A2 and A3 which are each surrounded by partial screens. The conductor of the phase conductor and the dielectric surrounding the conductor can be maintained. This pretreatment is applicable to all three phase conductors 1, 2 and 3. For the operation of the arrangement, the severed screens of the phase conductors are connected to each other in series with cyclical intersection in accordance with FIG. 5.

Figure 5:
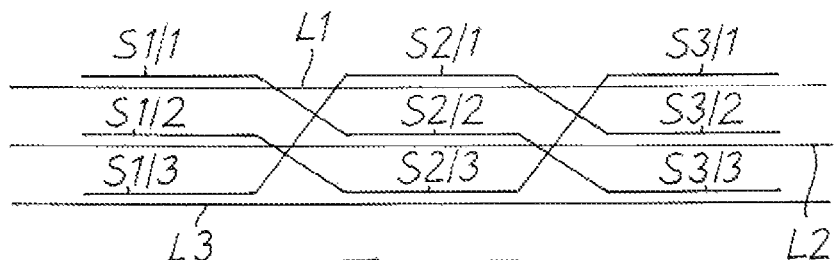
FIG. 5 shows an intersection schematic for the through connection of the screens of the phase conductors.

As already mentioned, each of the three phase conductors 1, 2 and 3 includes the three sections A1, A2 and A3 which are surrounded by corresponding partial screens, S1, S2 and S3. In accordance with FIG. 5, the partial screens are assigned to the respective phase conductor by a characteristic number indicated behind a line. The superconductive conductors thereof are denoted in FIG. 5 by L1, L2 and L3. Accordingly, the partial screen S1/1 is the partial screen of the first section of the phase conductor 1, while the partial screen S2/3 belongs to the second section of the phase conductor 3. Taking into consideration these denotations, the partial screens of the phase conductors 1, 2 and 3 are connected through as follows:

The partial screen S1/1 of the phase conductor 1 is electrically conductively connected to the partial screen S2/2 of the phase conductor 2 and further to the partial screen S3/3 of the phase conductor 3. Analogously, the partial screen S1/2 of the second phase conductor 2 is initially connected to the partial screen. S2/3 of the phase conductor 3 and further to the partial screen S3/1 of the phase conductor 1. In the same manner, the partial screen. S1/3 of the phase conductor 3 is initially connected to the partial screen S2/1 of the phase conductor 1 and further, to the partial screen S3/2 of the phase conductor 2. Consequently, each partial screen of a section of a phase conductor is only conducted to a partial screen each of another section of the two other phase conductors. The corresponding connections are shown in FIG. 5 as intersecting lines in accordance with the denotation "cyclical intersection."

As already mentioned, in the embodiment "cold dielectric," the phase conductors 1, 2 and 3 can be accommodated together in a cryostat. KR, however, they can also be accommodated in three separate cryostats, as is the case in phase conductors with hot dielectric. In the variation with three cryostats, the latter must be also severed, at the points of severing of the screens so that the partial screens can be electrically conductively connected through in accordance with the above discussion. The components of the cryostat produced as a result must subsequently be connected to each other electrically non-conductively with GFK pipes.

If the three phase conductors 1, 2 and 3 are accommodated in only one cryostat KR, the cyclical intersection of the partial screens is advantageously carried out in connecting sleeves.

The invention claimed is:

1. Superconductor arrangement comprising:
   three superconductive phase conductors that are constructed of a superconductive conductor as well as a dielectric and an electrically conductive screen surrounding the dielectric, said screen made from a normally conductive material; and
   at least one cryostat with said superconductive phase conductors arranged therein, said cryostat conducting a cooling agent, wherein the cryostat is composed of at least one pipe having a thermal insulation,
   wherein each of said electrically conductive screens of said superconductive phase conductors are divided into three, or a whole number multiple of three, partial screens, said partial screens extending successively in the longitudinal direction of each of said phase conductors, said partial screens completely separated from one another, at two locations, or at two locations arranged at a distance from each other, into a first, a second and a third partial screens, and
   wherein the partial screen of a first section of a first of said three phase conductors is electrically conductively connected in series to a partial screen of a second phase conductor of said phase conductors and further, to a third partial screen of a third phase conductor of said phase conductors.

2. Arrangement according to claim 1, wherein in an arrangement with cold dielectric, the phase conductors are accommodated in a common cryostat (KR).

3. Arrangement according to claim 1, wherein each phase conductor (1, 2, 3) is accommodated in its own cryostat.

4. Arrangement according to claim 1, wherein said conductive screen is made from copper.

* * * * *